May 18, 1965  E. L. FRY  3,184,045
PORTABLE CONVEYOR SYSTEM
Filed March 22, 1963  3 Sheets-Sheet 1

INVENTOR.
Edwin L. Fry
BY WHITEHEAD, VOGL & LOWE
PER Frank C. Lowe
ATTORNEYS

May 18, 1965  E. L. FRY  3,184,045
PORTABLE CONVEYOR SYSTEM
Filed March 22, 1963  3 Sheets-Sheet 2

INVENTOR.
Edwin L. Fry
BY WHITEHEAD, VOGL & LOWE
PER Frank C. Lowe
ATTORNEYS

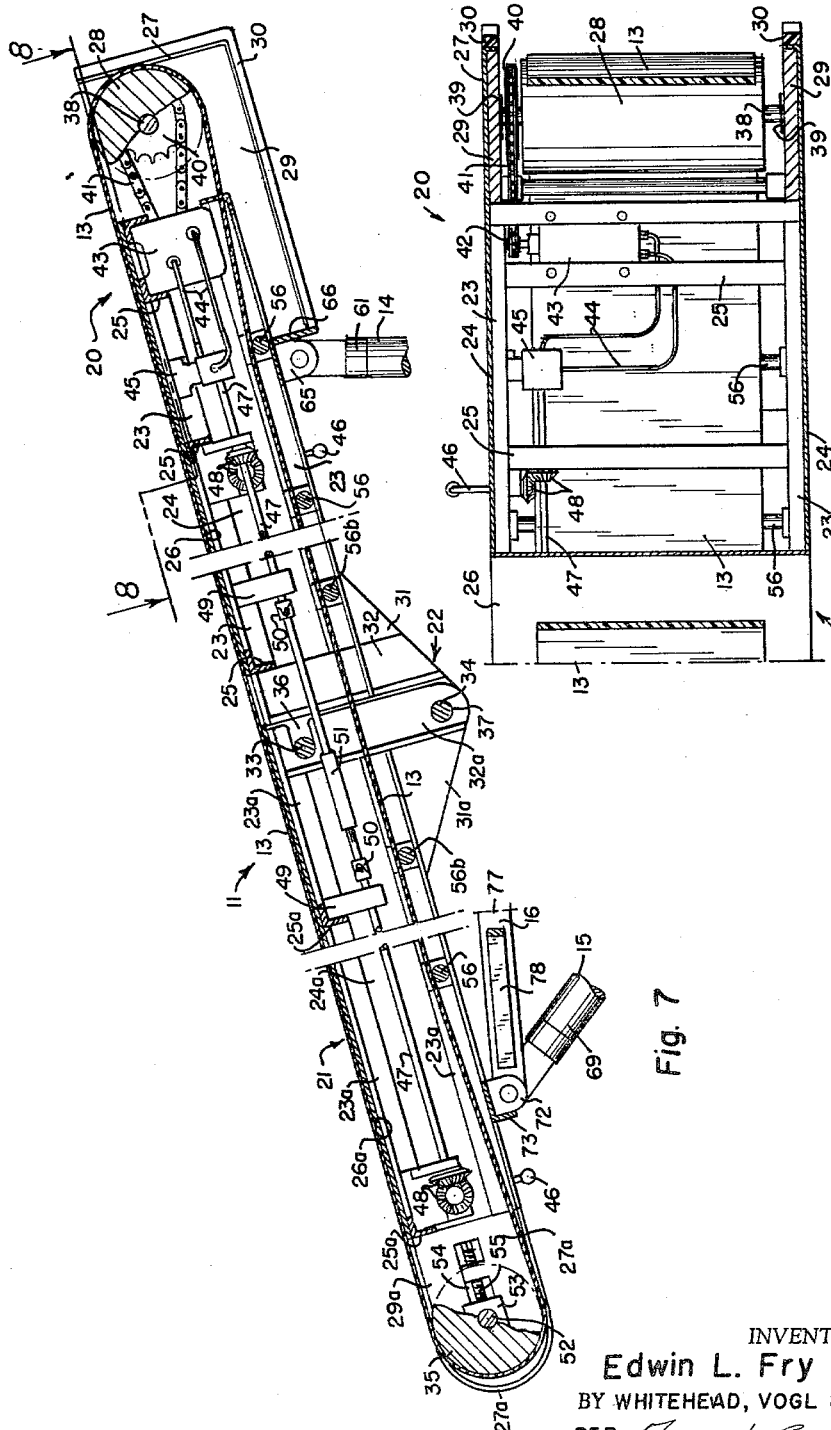

3,184,045
PORTABLE CONVEYOR SYSTEM
Edwin L. Fry, Canon City, Colo., assignor to Fry and Company, Canon City, Colo., a corporation of Colorado
Filed Mar. 22, 1963, Ser. No. 267,279
7 Claims. (Cl. 198—233)

This invention relates to conveyors and more particularly to portable, unitized conveyors of the general class which provide a moving, continuous conveyor belt surface for receiving, transporting, and depositing a series of items such as articles of baggage.

The primary object of the invention is to provide a novel and improved portable conveyor unit which is especially adapted to handle articles of freight and baggage and to facilitate the loading and unloading of the same to and from transport carriers of various types. As such, the invention will be called a portable baggage conveyor although it is to be understood that the invention is not to be restricted to only such a preferred mode of use.

Another object of the invention is to provide a novel and improved portable baggage conveyor which is characterized by versatile and adjustable operational facilities which permit and enhance: the quick spotting of the conveyor unit as between unloading and receiving transport carriers or as between a carrier and a dock; the selective elevational shifting of both the receiving and the discharging ends of the conveyor to position the ends of the conveyor at the deck levels of various carriers for effective movement of articles onto and off from the conveyor with a minimum of manual effort; and, the reversal of direction of the conveyor movement to permit both loading and unloading as from one carrier to the other without shifting or repositioning the conveyor.

Another object of the invention is to provide a novel and improved portable baggage conveyor which incorporates an elongated conveyor belt structure with an extendable supporting means to permit each end of the conveyor belt to be raised or lowered as required without the necessity of sectionalizing the structure and changing the pitch of one portion of the conveyor belt structure with respect to the pitch of another portion to obtain selected elevational adjustments.

Another object of the invention is to provide a novel and improved support structure for a conveyor belt which is adapted to be conveniently mounted and carried upon a conventional truck or like vehicle and which is further characterized by elevation-adjustment means at each end of the conveyor combined with a simplified stabilizing linkage whereby to hold and support the conveyor belt at any selected inclination and elevation above the supporting vehicle.

Yet other objects of the invention are to provide a novel and improved portable, elevationally-adjustable baggage conveyor which is a simple, low-cost, neat-appearing rugged and durable unit.

With the foregoing and other objects in view, all of which more fully hereinafter appear, my invention comprises certain novel constructions, combinations, and arrangements of parts and elements as hereinafter described, defined in the appended claims, and illustrated in the accompanying drawing in which:

FIGURE 7 is a longitudinal sectional view of the conveyor unit and fragment of the supporting structure, as taken from the indicated line 7—7 at FIG. 4, but on a greatly enlarged scale and with intermediate portions of the conveyor structure being broken away to conserve space.

FIGURE 8 is a fragmentary sectional detail of a portion of the conveyor unit as taken from the indicated line 8—8 at FIG. 7 to illustrate the arrangement of the driving means in the conveyor.

Figures 1, 2, 3, 6:
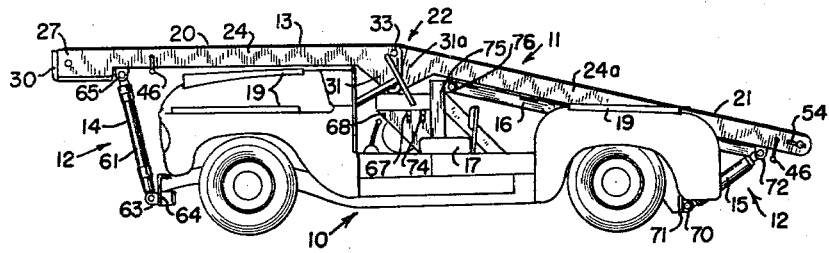
FIGURE 1 is a side elevational view of a conventional truck-type vehicle having its body structure and frame stripped down to accommodate my baggage conveyor with the conveyor shown in its retracted position, being mounted upon an improved supporting means constructed in accordance with the principles of my invention.
FIGURE 2 is a plan view of the unit illustrated at FIG. 1, to show the preferred arrangement with the conveyor unit being at one side of the vehicle, opposite the driver's compartment, and with controls and walkways on the fenders and engine hood of the vehicle being at the drivers side thereof.
FIGURE 3 is a rear end elevational view of a unit illustrated at FIG. 1.
FIGURE 6 is a plan view of a portion of the vehicle, and a fragmentary sectional view of a portion of the conveyor and its support structure, as taken from the line 6—6 at FIG. 5, to illustrate further, the construction of the stabilizing linkage supporting the conveyor upon the truck.

In the movement of packages and baggage in various transportation operations, there is a continuous transfer and shift of baggage as from a carrier to a loading dock or from one carrier to another. To minimize the effort of such shifting, various commercial agencies endeavor to standardize their dock heights and the height of truck approach ramps to obtain uniformity of deck elevations, all to generally conform with the standard elevation of the deck of a rail car. This leveling-off is to provide, insofar as possible, a horizontal path for the necessary movement of baggage to minimize the physical effort of lifting the baggage. Often where this is not possible, motor-driven, inclined conveyor belts have been introduced to reduce the physical work involved in the baggage transfer operations.

As air travel has become more extensive with continually increasing air transport operations, a new phase in the problem of loading and unloading baggage has developed. An airplane cannot dock at any selected spot so the loading and unloading operations must be at the airplane on the landing field. Also, the height of the modern airplane above the ground is quite substantial and will vary from six to twelve feet. It is immediately manifest that ordinary loading equipment used for loading and unloading operations at a freight dock cannot be used. Instead, load-elevating equipment is required and there has been a trend for using truck-mounted inclined conveyor belt units which may move to the airplane location. The lower end of the conveyor belt remains at the ground level while the upper end of such a conveyor belt will reach to the airplane hold. Such a conveyor, however, has some serious limitations. It cannot adequately service different types of aircraft and it is useless for auxiliary operations not connected with the aircraft. Moreover, the base end is usually designed for one type of truck and it is not suitable for use with different types of trucks or other vehicles which may come to the airplane with a load of baggage. For example, the deck levels of the baggage cart, a pickup truck and a large van-type truck will vary three feet or more.

The problem so acutely pointed out by the need for improved aircraft loading operations, which has actually existed for a long time in other types of transportation operations, has brought about the development of portable conveyors having elevationally adjustable conveyor belts. Such is accomplished by forming the conveyor belt frame or a portion of it as an inclined boom which is rocked about a fixed pivot on the truck body so that the end of the boom, the conveyor, may be raised or lowered to any selected height. Both ends of the conveyor belt frame may be so pivoted to make the unit more versatile. The obvious disadvantage of the latter arrangement resides in the fact that when adjusted to different elevations, the path of the conveyor belt may abruptly change to dip or rise at the point where the boom is pivoted to the truck. Belt hold-downs and side rails are required at this section whenever the change in inclination is more than a few degrees because the baggage will otherwise fall off the belt at this point.

It was with such and other considerations in view that the present invention was conceived and developed and the invention comprises, in essence, a truck-mounted conveyor belt which is supported upon the truck by a simple arrangement of elevators and stabilizing links to permit the frame to be lifted from the truck and elevational adjustments to be made at both ends of the conveyor frame. In the unit hereinafter described, the frame, when lifted off the truck body, is straight in its alignment. However, it is adapted to be folded over the truck body when in its lower retracted position. Certain advantageous operations are possible with operation at such lowered position, but such is not essential to the broader features of the invention.

Referring more particularly to the drawing, my improved portable baggage conveyor consists of three primary components, a truck 10, a conveyor section 11, and supporting and elevating mechanisms 12 which support the conveyor section upon the truck. The truck 10 is of any conventional type and such as a ¾-ton pickup unit which is stripped of most of the body accessories to accommodate it to the conveyor section 11 and elevating mechanisms 12. The conveyor section 11 is, in many respects, a conventional, longitudinally-extended, self-actuated unit carying a continuous conveyor belt 13. It is proportioned to substantially exceed the length of the truck and overhang each end of the truck. The supporting and elevating mechanisms 12 include a front elevator 14 which upstands from the front end of the truck to connect with the conveyor section 11 near its front end, a rear elevator 15 which upstands, and outstands, from the rear end of the truck to connect with the conveyor section 11 near its rear end and a stabilizer 16 which is connected to the center portion of the truck to extend rearwardly therefrom to connect with the conveyor section at the common point of connection of the rear elevator 15, all as hereinafter described in detail.

The width of the conveyor section 11 is adapted to carry a standard type conveyor belt, such as a 24-inch belt, and will overly about one-half the width the truck 10. The section 11 is thus conveniently disposed above the right half of the truck to leave the drivers seat 17 and the portions in front of and behind the seat clear of obstructions as illustrated at FIG. 2. To prepare the truck to accommodate and hold this conveyor section 11, it is stripped of the windshield, the passenger's seat, the sidewall panelling, the tailgate and the bumpers. Also, to better accommodate the right edge of the conveyor section, the right rear bumper 18 may be mutilated by cutting away an inner top portion thereof. Suitable walkways 19 are provided in the clear spaces at the left side of the truck to facilitate reaching and working with the conveyor unit when it is elevated above the truck. These walkways may be located upon the left fenders, the rear deck, and upon the hood as illustrated at FIG. 2.

Figure 5:
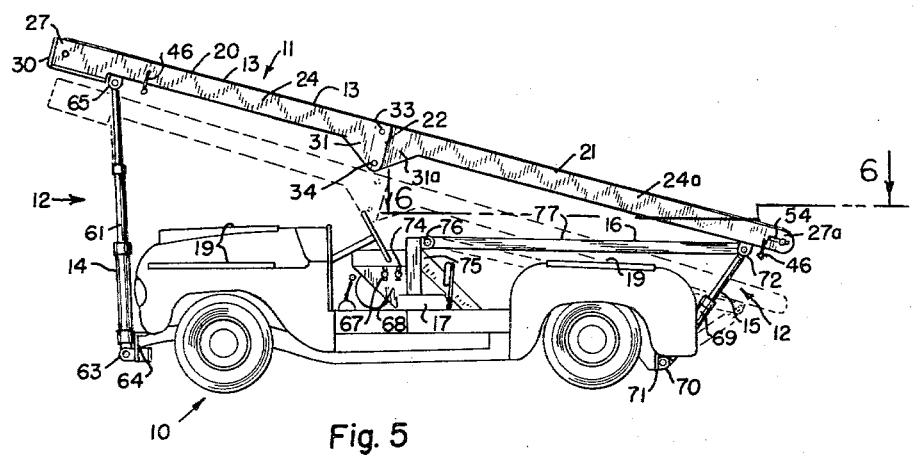
FIGURE 5 is a side elevational view similar to FIG. 1, but with the conveyor being at its fully raised position, also with broken lines indicating the conveyor as being raised to an intermediate position.

In the illustrated embodiment, the conveyor section 11 is formed as a front reach 20 and a rear reach 21 which are hinged together by an elbow hinge 22. This elbow hinge holds the reaches in straight alignment when the section is raised above the truck as illustrated at FIG. 5, but permits the reaches to fold upon the truck body with the front reach lying upon the engine hood of the truck and the rear reach dropping down to near the level of the rear deck at the rear end of the truck, as illustrated at FIG. 1. Both reaches are constructed in a similar manner and substantially according to conventional design, each reach being formed as a box-like unit by a framework of structural angles enclosed by side plates and cover plates.

The structural features of the front reach 20 include upper and lower longitudinal angle members 23 at each side thereof which are held apart by side plates 24. Transverse angle struts 25 are disposed at selected spacings along the reach between the longitudinal members 23 to support a top plate 26 upon which the belt 13 lies. The forward extended end of the reach is formed as enlarged heads 27 with one head being at each side of the unit. A drive roller 28 is mounted between these heads as hereinafter described. The heads 27 are formed as by an extension of the side plates and by other structural reinforcing members illustrated, for purposes of convenience, as filler blocks 29. To complete the heads, a bumper strip 30 of rubber or the like is extended about the front and bottom edges of each. The opposite end of the front reach 20, at the elbow hinge, is formed with the side plates 24 extending downwardly as a widened portion 31, the end of which overlap the reach 21 to form the elbow hinge 22. This widened portion is reinforced by a suitable angle member 32 and the hinge part includes two transverse rods extending across the members at the overlapping end portions. An upper rod forms a stop rod 33, and a lower rod forms a pivot rod 34, as will be further described.

The structural features of the rear reach 21 are similar, including upper and lower longitudinal angle members 23a, side plates 24a, transverse angle struts 25a, and a top plate 26a. Also, the rearward extended end of the reach is formed as extended head portions 27a wherebetween a rear idle rollers is mounted. These rearward heads are not enlarged, and for convenience of construction, their ends may be rounded. They are formed by extensions of the side plates 24a and other reinforcing members indicated, for convenience as filler blocks 29a. The opposite end of the rear reach 21, at the elbow hinge is formed with the side plates 24a extending downwardly as widened portions 31a which are overlapped by the portions 31 of the forward reach. The widened portions 31a are reinforced by a short angle member 32a located at the very end of the reach. This angle member 32a and widened portion 31a include a notch 36 near its top wherein the stop rod 33 lodges when the conveyor section 11 is in straight alignment, and also includes an orifice 37 near its base wherethrough the pivot rod 34 extends to interconnect the two reaches together. From the above described mode of interconnection, the operation of the elbow hinge to permit downward folding of the ends of the conveyor section is obvious.

The drive roller 28 is mounted upon a shaft 38 which extends into bearings 39 in the filler blocks 29. This drive roll includes a sprocket 40 which is connected, as by a chain 41, to the drive sprocket 42 of a motor 43 lodged between the frame members 25 of the front reach 20, as illustrated at FIG. 7. The motor is preferably a reversible, high-pressure hydraulic type since very small units of this type afford a high torque, high-power output. A motor having sufficient power output to drive an ordinary conveyor section of the size contemplated can be easily fit within the frame members as illustrated.

Hydraulic lines 44 extend from the motor to a 4-way control valve 45 which regulates the forward, reverse and off movement of the motor. Thence, the lines extend to a power pressuring source in the truck. However, the extension of the lines and the pumping equipment in the truck are not shown since such arrangements of pressure lines and pressure generating hydraulic equipment are quite conventional. The control valve 45 is operated manually and preferably by a lever 46 at each end of the left side of the conveyor section. The two hand levers are interconnected to a longitudinally disposed shaft 47 to operate in unison, with the shaft extending to the control valve 45, the levers being connected to the shaft as by bevel gears 48. Movement of the sections 20 and 21 at the elbow hinge 22 must be accompanied by flexure of the shaft 47, or if this is not desired, the shaft may be supported in bearings 49 at each side of the elbow 22 with universal joints 50 adjacent the bearings and with a telescopic splined section 51 in the section of the rod between the universal joints as in the manner illustrated at FIG. 7.

The idle roller 35 is mounted upon a shaft 52 which is carried in bearing blocks 53. The blocks 53 are, in turn, mounted in ways 54 in the filler blocks 29a and with take-up screws 55 being also positioned in the ways to bear against the blocks, to permit the belt to be tightened in a conventional manner.

The belt 13 extends from the top plate 26 upwardly and about the drive roll 28 (since the drive roll is normally at the upper end of the section), thence, underneath the frame portions to be supported upon a series of spaced, bottom, idle hold-rolls 56 and thence to the idle roll 35 whereabout it turns to lie again upon the top plate 26. A pair of spaced hold rolls 56b are located at the center of the unit adjacent the elbow hinge, with each being spaced from the elbow hinge a distance sufficient to permit the belt to drop and loosen along the lower reach between these rolls an amount which is sufficient to substantially compensate for the stretch incurred at the top reach, on the plate 26, when the section is bent at the elbow hinge 22 as in folding it upon the truck as illustrated at FIG. 1.

The conveyor belt 13 is operable as a reversible unit even though a single drive roll is used, and this roll was found to be sufficient even with the top belt surface moving from the forward end towards the rear end of the belt when the top surface of the belt is essentially under compression. This was found possible since the belt could be adjusted to a comparatively tight fit and since the forward end of the section is normally well above the rearward end of the conveyor section due to the manner in which the section is mounted upon the truck by the hoisting mechanisms 12. When loads move downhill, they facilitate smooth operation even with the drive roll pushing the top surface of the belt and the unit was observed to reverse satisfactorily even when the belt was substantially level.

The front elevator 14 of the hoisting mechanism 12 consists of a pair of jacks 61 held in spaced parallelism by a spacer frame 62 which is affixed to the cylinder of the jacks. The bases of these jack cylinders are pivotally connected to brackets 63 which outstand from the face of a transverse support bar 64 which, in turn, is attached to the front end of the truck frame in lieu of the conventional bumper. The piston ends of these jacks are pivotally connected to brackets 65 at the under side of the front reach 20 of the conveyor section, the brackets 65 being affixed to the underside of a transversely disposed frame angle 66 on the section. Accordingly, extension of the hydraulic jacks 61 of the front elevator 14 will lift the front end of the conveyor section. The pivoted connections of the cylinders to the truck and to the conveyor will permit longitudinal shifting movements of the conveyor with respect to the truck, but the spacer frame 62 will hold the assembly rigid against lateral movement.

Suitable fluid lines, not shown, extend from the base of these jacks 61 to a hydraulic control system within the truck. This control system includes a valve lever 67 at a control panel 68 alongside the drivers seat 17. This control valve 67 may be raised or lowered to raise or lower the jacks 61 respectively. The hydraulic system within the truck, other than the lever 67, which forces these jacks to operate in unison, is not shown since such hydraulic systems are quite conventional.

The rear elevator 15 consists of a pair of jacks 69 having the bases of their cylinders pivotally affixed to angle brackets 70 which outstand from a transverse support bar 71 at the rear end of the truck frame. The piston ends of these jacks are pivotally connected to brackets 72 which depend from a transversely disposed frame angle 73 at the under side of the reach 21. These hydraulic cylinders are operated by fluid lines, not shown, which extend from the base of the jacks to the control system within the truck heretofore mentioned. The system includes in their circuit a control valve on the panel 68 having a valve lever 74. Upward and downward movement of this valve lever 74 extends and retracts the jacks 69 to raise and lower the rear end of the conveyor section 11. It is to be noted that the jacks 69 are not necessarily interconnected as by a spacer frame to impose lateral stability at the rear end of the unit because the stabilizer 16, which is preferably connected with the rear jack system, performs the function of laterally stabilizing the rear end of the conveyor section.

The stabilizer 16 is adapted to control the longitudinal shifting of the conveyor section as well as rigidifying it laterally. It is mounted upon a trusses stand 75 which upstand from the center portion of the truck alongside the drivers seat 17. Pivot brackets 76 extend rearwardly from the top of this stand and a pair of longitudinal, rearwardly extended rods 77 are pivotally connected to the brackets 76. The rearward ends of the rods 77 are pivotally connected to the brackets 72 at the under side of the conveyor section in common with the connection of the piston ends of jacks 69. The pair of longitudinal bars 77 lie spaced apart and are preferably parallel. They are held in rigid interrelationship to resist lateral shifting or racking as by a pair of cross bars 78 which extend between the diagonally opposite ends, as illustrated at FIG. 6. These cross bars effectively hold the rear end of the hoisting mechanism and the conveyor section secure against lateral movements.

Figure 4:
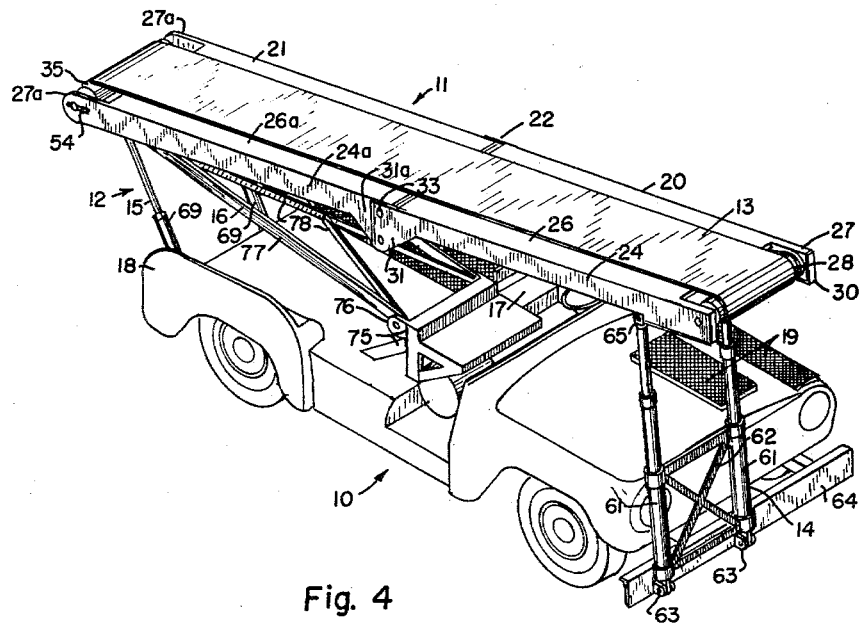
FIGURE 4 is an isometric view of the unit illustrated at FIG. 1, looking towards the front and the right side of the vehicle and with both ends of the conveyor being elevated to a fully raised position.

As illustrated at FIGS. 4 and 5, the supporting and elevating mechanism, including the front elevator 14, the rear elevator 15, and the stabilizer bar 16, permits the conveyor section to be raised above the truck to set the front and rear ends at any selected level and generally when so raised the elbow hinge is closed and the conveyor section 11 is in straight alignment. The stabilizing bar 16 is connected to the truck and to the conveyor section at spaced-apart points, and in combination with the rear elevator 15, it forms a longitudinally stable truss-like arrangement. With such, the front elevator 14 may raise or lower the front end of the conveyor by simply swinging of the conveyor section about the pivots at the brackets 72. With the front end set at any desired elevation, the raising or lowering of the rear elevator shifts the rear end of the conveyor section upwardly or downwardly as desired without any substantial lateral movement of the section.

The preferred connection of the stabilizer 16 is as shown, to brackets 76 at the center of the truck and to brackets 72 at the rear of the conveyor section. It is to be recognized, however, that other arrangements of the stabilizer are possible to obtain a similar action, for the stabilizer 16 may be pivoted to other points on the conveyor section than at the brackets 72 and at other points on the truck frame than at a central bracket 76. The purpose of a stabilizer bar is to restrain the conveyor section from excessive lateral shifting as the conveyor section is raised and lowered and to hold the conveyor section in any selected position once it is set. To effect this result, it is preferred that the stabilizing bar be at a comparatively small or flat angle with respect to the conveyor section and at a comparatively wide or large angle with respect to the elevator jacks supporting the section. It is also desirable that the stabilizing bar be comparatively long so that it will not swing through too great an arc when the conveyor section is being raised and lowered, for this minimizes the extent of the longitudinal shift of the section.

While I have now described my invention in considerable detail, it is obvious that others skilled in the art can build and devise alternate and equivalent constructions which are within the spirit and scope of my invention, since I desire that my protection be limited, not by constructions illustrated and described, but only by the proper scope of the appended claims.

I claim:

1. A portable elevating conveyor comprising in combination with a motorized self-propelled vehicle:
 (a) an end-support bracket means at each end of the vehicle and an intermediate-support bracket means upon the body of the vehicle;
 (b) an elongated conveyor section adapted to be longitudinally disposed above the vehicle with each end of the section overlying an end of the vehicle;
 (c) an extendible elevator means at each end of the vehicle, with the base of each elevator means being pivotally mounted upon an end-support bracket means to generally upstand from the end of the vehicle and with the extended end of each elevator means being pivotally connected to the end portion of the conveyor section thereabove to thereby raise and lower that end of the conveyor section; and,
 (d) a stabilizer bar having a base end pivotally mounted upon the intermediate-support bracket means on the vehicle to extend generally longitudinally underneath the conveyor frame and having an extended end pivotally connected to the conveyor-frame, elevator-means combination at a location which is longitudinally offset a substantial reach from the point of connection at the intermediate-support bracket means, whereby to incline the stabilizer bar more generally horizontally than vertically and to minimize the longitudinal shift of the conveyor section with respect to the vehicle as it is raised and lowered by the elevator means.

2. In the organization set forth in claim 1, wherein the elevator means comprises hydraulic jacks having their base ends pivotally connected to the vehicle and their upwardly extended ends pivotally connected to the underside of the conveyor section frame, and wherein the stabilizing means include a longitudinally disposed bar having one end pivotally connected to the vehicle and the other end pivotally connected to a point on the conveyor section elevator means combination which is longitudinally offset a substantial reach from the point of connection to the vehicle whereby to incline the stabilizer bar more generally horizontally than vertically.

3. In the organization set forth in claim 1 wherein the conveyor section frame includes an elbow joint near its center portion adapted to open to permit the frame to be folded downwardly and upon the vehicle when the elevating means are retracted but to close and lock to hold the conveyor frame in rigid, straight alignment whenever the elevator means are extended to lift the conveyor section off the vehicle.

4. In the unit defined in claim 1 wherein each elevator means includes a hydraulic jack; and a control panel in the vehicle having independent operative control valves for each elevating means whereby to provide individual elevational adjustments at each end of the vehicle to set the conveyor section at any selected inclination and height above the vehicle.

5. In the organization set forth in claim 4 wherein the conveyor frame includes an elbow hinge near its center portion adapted to open to permit the conveyor section to fold upon the vehicle whenever the elevating means are fully retracted but to lock to hold the conveyor section in straight alignment whenever the elevator means lift it above the vehicle.

6. In the organization set forth in claim 1, wherein the pivotal connection of the stabilizer bar with the conveyor-frame, elevator-means combination is at the pivotal connection of the extended end of an elevator means with an end portion of the conveyor section.

7. In the organization set forth in claim 1, wherein the conveyor section is adapted to be normally inclined with one end being near ground level, and with the end-support bracket means at that end of the vehicle being positioned close to the ground level of the vehicle and with the elevator means carried thereon being adapted to retract to a short length, wherein the pivotal connection of the stabilizer bar with the conveyor-frame, elevator-means combination is at the pivotal connection of the extended end of the short-length elevator means and the conveyor section, and wherein the intermediate-support bracket is located on the vehicle at an elevation substantially the same as the described frame-elevator connection, whereby to permit the stabilizer bar to lie substantially horizontal in normal use when the end of the conveyor section will be near the ground level.

References Cited by the Examiner

UNITED STATES PATENTS

| 2,180,032 | 11/39 | Casley | 224—42.03 |
| 2,631,715 | 3/53 | Vickers | 198—233 |
| 2,761,569 | 9/56 | Iserman | 212—38 |

FOREIGN PATENTS 556,492  4/58  Canada.

SAMUEL F. COLEMAN, *Primary Examiner.*

ERNEST A. FALLER, Jr., *Examiner.*